Patented June 23, 1936

2,045,455

UNITED STATES PATENT OFFICE 2,045,455

POLISH

George W. Flint, Chicago, Ill., assignor to Standard Oil Company, Chicago, Ill., a corporation of Indiana No Drawing. Application March 16, 1934, Serial No. 715,939

9 Claims. (Cl. 134—24)

My invention relates to polishes and more particularly to wax polishes of a type which leave a lustrous glossy finish without rubbing and which therefore may be referred to as self-rubbing polishes.

It is an object of my invention to produce a superior polish of the type before mentioned. In particular, it is my object to produce a polish of this type in the form of a stable emulsion. It is a further object of my invention to produce a polish which will leave a wax-containing film which will be hard and lustrous without being rubbed and which will retain its hardness and luster on being washed with cold water.

It has been customary in the past to produce wax polishes by dissolving the wax and other constituents in a solvent which evaporates when applied to the surface to be polished leaving a spongy non-lustrous film which has to be rubbed vigorously in order to produce the desired hard lustrous finish. I find that by the emulsification of various hereinafter described materials in certain critical proportions and in a particular manner it is possible to produce a stable, emulsified wax polish which will leave a hard, lustrous, wear-resistant and washable film without rubbing. I am by no means completely able to account for the effect which the various ingredients of my new composition of matter have nor am I entirely able to account for the results achieved by my preferred method of manufacture. I do find, however, that an emulsified wax polish made in accordance with my invention is highly superior to those of the prior art.

I will first describe my invention in terms of certain specific embodiments thereof and will then indicate, insofar as possible, the equivalent materials which can be used and the ranges of concentrations which can be employed. The compositions of three of the best polishes which I have been able to make are set forth in the following table:

|  | Percentage by weight | | |
|---|---|---|---|
|  | I | II | III |
|  | Percent | Percent | Percent |
| Emulsion A: | | | |
| Carnauba wax | 10.1 | 13.2 | 10.0 |
| Triethanolamine | 1.4 | 1.3 | 1.1 |
| Oleic acid | 1.4 | 2.6 | 1.1 |
| Borax | 1.0 | 1.9 | 0.7 |
| Water | 70.4 | 66.3 | 70.0 |
| Emulsion B: | | | |
| Refined shellac | 1.4 | 1.3 | 2.8 |
| Ammonium hydroxide (0.90 sp. gr.) | 0.2 | 0.2 | 0.3 |
| Water | 14.1 | 13.2 | 14.0 |
|  | 100.0 | 100.0 | 100.0 |

Of the above polishes, No. I is probably the best. No. II is an example of a polish containing a relatively high proportion of wax, and No. III is an example of a polish using a relatively large proportion of shellac and relatively low proportions of triethanolamine and oleic acid.

It will be noticed that the above compositions refer to two separate emulsions designated A and B respectively. This is due to the fact that in making up my polish it is necessary, or at least highly desirable, to first prepare an emulsion of the materials listed under Emulsion A and an emulsion of the materials listed under Emulsion B and then add the two together, preferably adding Emulsion B to Emulsion A.

In more detail the preferred method of making my polish consists in melting the wax, triethanolamine, oleic acid and borax together and then adding boiling water and boiling, preferably with vigorous mechanical agitation, until a homogeneous emulsion is produced. Instead of melting the borax together with the wax, triethanolamine and oleic acid, the borax can be dissolved in a portion of the water and added to the melted materials as a hot, concentrated aqueous solution, the remainder of the water then being added. It is also possible to add the borax after the other materials have been emulsified in all of the water specified under Emulsion A but this is not the preferred procedure. Emulsion B is preferably prepared by diluting the ammonium hydroxide with a portion of the water specified, adding this dilute solution to the powdered shellac, agitating, and then adding the balance of the water specified under Emulsion B. Emulsions A and B can also be prepared by use of a colloid mill.

After the two emulsions have been prepared, Emulsion B (hot or cold) is added to Emulsion A (hot), and the mixture is then agitated and cooled as rapidly as possible. I find that this rapid cooling produces a product which gives a better luster and which shows less tendency to gel than would otherwise be the case. This rapid cooling can be secured by the use of cooling coils located in the mixing vessel or by withdrawing the product from the vessel through a water-cooled pipe or by filling the material rapidly into small containers such as pint or quart cans.

As previously mentioned, I do not know definitely just what the effect of each of the constituents of my polish is and I do not desire to be bound by any theory as to the roles played by the various constituents. Nevertheless, for purposes of illustration and to assist in the comprehension of my invention, I will point out to the best of my ability the function of each of the constituents. The carnauba wax is probably the most important constituent of the final film left by the polish on the evaporation of the volatile constituents. The triethanolamine and oleic acid no doubt unite in the process of manufacturing my polish to form a soap which serves as an emulsifying agent. The borax appears to act as a lusterizing agent and gives the desired lustrous film. It may also act by reacting with the triethanolamine oleate to modify the original emulsion in some manner which produces desirable results. The shellac appears to prevent the gelation of the emulsion and it may also have the effect of forming a solid solution with the wax when the volatile constituents are evaporated thus producing a harder, denser film than would be the case with the wax alone. The ammonia renders the shellac soluble or at least dispersible in water.

While I prefer to use the constituents previously mentioned and while I find that each of them is important in producing my preferred polish it nevertheless is possible to substitute various other materials for each of them. Thus, instead of using carnauba wax it is possible to use other hard waxes such as Montan wax, Japan wax, candelilla wax, ceresin wax, petrolatum wax, beeswax, the hard, high-melting chlorinated naphthalenes known commercially as Halowax, the high melting point synthetic waxes known commercially as I. G. waxes, etc. Any of these can be used alone or in mixtures with each other or in mixtures with carnauba wax. Nevertheless, I find that carnauba wax is to be preferred.

In place of the triethanolamine and oleic acid, other emulsifying agents can be used. I find, however, that the ordinary soda and potash soaps are not desirable but produce a very hazy polish. My preferred emulsifying agents are the soaps of mono-, di-, and tri-ethanolamine, and are preferably formed in situ as in the case of the triethanolamine oleate in the above example. The oleates, stearates, palmitates, ricinoleates, etc. can be used. The corresponding soaps of ammonia are also suitable except that they decompose at the temperatures used in my process unless pressure is used.

Borax is highly preferred as a lusterizing agent. Other salts such as trisodium phosphate, sodium carbonate, and sodium silicate can, however, be used.

The shellac is a very important ingredient. A highly refined shellac is to be preferred and it should be stored in a cold place, for instance, in an ice chest, while awaiting use. Casein can be used with the shellac or in place of it.

The ammonium hydroxide is present for the purpose of dispersing the shellac. Other alkaline materials, such as sodium and potassium hydroxides and carbonates, the mono-, di-, and tri-ethanolamines, etc. can be used.

I have set forth above certain preferred proportions of the various ingredients of my polish. These are subject to considerable variations depending on the equivalents chosen, the results desired, the details of the manufacturing process employed, etc., and the amounts of the various constituents necessary to give optimum results will vary as the proportions of other constituents are varied. Nevertheless, it is possible to indicate roughly the operative limits of each of the indicated constituents or its equivalent as set forth in the last paragraph. The amount of wax should preferably be between about 8% and about 15%. Much lower wax concentrations, say down to about 3%, can be used but the polish thus produced is very dilute. Highly concentrated polishes can also be produced with wax contents as high as 25% but these are not recommended. The preferred range for the triethanolamine is from about 1.1% to about 1.6%. It is not possible to use much less than about 1.0% if a satisfactory emulsion is to be secured and it is not feasible to go much over about 3% since the excess tends to be washed out of the film produced by the polish when the latter is washed with cold water, thereby injuring the film. The oleic acid should be present to the extent of about 1.5 times the amount of triethanolamine. Less than about .75 times the amount of triethanolamine results in unstable emulsions and more than about twice the amount of the triethanolamine results in a polish which tends to gel, particularly on storage. In other words, the total amount of emulsifying agent will vary, in general, from about 1.75% to about 9%. If wax contents over about 15% are used, the amount of emulsifying agent must be correspondingly increased. The amount of borax can be varied between about 0.5% and about 3%. The amount of water used in making up Emulsion A can be varied within wide limits. Amounts from about 40% to about 80% are usually satisfactory. The amount of shellac can be varied from about 1%, or somewhat less up to about 5%. The amount of ammonium hydroxide or other alkali is determined by the amount required to carry the shellac into solution. It ranges, in general, from about 0.1% to about 0.3%. The amount of water used in making up Emulsion B is not critical. It must be at least about four times the amount of the shellac, however, in order to completely dissolve or disperse the latter. The various percentages above given are all expressed in terms of percent by weight of the total constituents.

I also find that one or both of two other ingredients can be added to my polish. One of these is linseed oil or other drying oil. About 0.5% by weight of linseed oil added to Emulsion A in Example I gave a final film of improved gloss. From about 0.1% to about 2% of drying oil, preferably linseed oil, can be used.

The second additional ingredient which I find to be of advantage is "carbitol" (the mono-ethyl ether of diethylene glycol) or other ether boiling above 100° C. or preferably 150° C. About 0.5% by weight of carbitol added to Emulsion A in Example I markedly improved the final finish of the film left by the polish. From about 0.1% to about 2% of the high boiling ether can be used.

Example I, as modified by the inclusion of these two additional ingredients is as follows:

Example IV

| Emulsion A: | Per cent |
|---|---|
| Carnauba wax | 10.0 |
| Triethanolamine | 1.4 |
| Oleic acid | 1.4 |
| Borax | 1.0 |
| Linseed oil | 0.5 |
| Carbitol | 0.5 |
| Water | 69.7 |
| Emulsion B: | |
| Refined shellac | 1.4 |
| Ammonium hydroxide (0.90 sp. gr.) | 0.2 |
| Water | 13.9 |
| | 100.0 |

The polishes produced in accordance with my invention are particularly suitable for use on flooring but may also be used in polishing other types of woodwork and other surfaces. They can also be used in waxing ply-wood forms and as horticultural wax emulsions.

While I have described my invention in connection with certain specific embodiments thereof and in connection with certain theories, it is to be understood that these are by way of illustration only and not by way of limitation.

I claim:

1. An emulsified composition of matter for polishing floors comprising approximately the following weight percentages of the following ingredients:

|  | Per cent |
|---|---|
| Carnauba wax | 10.0 |
| Triethanolamine | 1.4 |
| Oleic acid | 1.4 |
| Borax | 1.0 |
| Refined shellac | 1.4 |
| Ammonium hydroxide | 0.2 |
| Water to balance to | 100 |

2. An emulsified composition of matter comprising approximately the following weight percentages of the following ingredients:

|  | Per cent |
|---|---|
| Carnauba wax | 10.0 |
| Triethanolamine | 1.4 |
| Oleic acid | 1.4 |
| Borax | 1.0 |
| Refined shellac | 1.4 |
| Ammonium hydroxide | 0.2 |
| Drying oil | 0.1 to 2 |
| Water to balance to | 100 |

3. A composition according to claim 2 in which said drying oil is linseed oil.

4. A dilute aqueous emulsion comprising the following ingredients in substantially the following proportions by weight:

|  | Per cent |
|---|---|
| Carnauba wax | 10.0 |
| Ethanolamine | 1.4 |
| Oleic acid | 1.4 |
| Borax | 1.0 |
| Linseed oil | 0.5 |
| Refined shellac | 1.4 |
| Ammonium hydroxide | 0.2 |
| Water to balance to | 100 |

5. An emulsified composition of matter comprising approximately the following weight percentages of the following ingredients:

|  | Per cent |
|---|---|
| Carnauba wax | 10.0 |
| Triethanolamine | 1.4 |
| Oleic acid | 1.4 |
| Borax | 1.0 |
| Refined shellac | 1.4 |
| Ammonium hydroxide | 0.2 |
| Glycol ether boiling above 100° C | 0.1 to 2 |
| Water to balance to | 100 |

6. A composition according to claim 5 in which said glycol ether is the mono-ethyl ether of diethylene glycol.

7. An aqueous emulsified polish comprising the following ingredients in approximately the specified proportions by weight:

|  | Per cent |
|---|---|
| Carnauba wax | 8 to 15 |
| Ethanolamine | 1 to 3 |
| Oleic acid | 0.75 to 6 |
| Borax | 0.5 to 3 |
| Shellac | 1 to 3 |
| Ammonium hydroxide | 0.1 to 0.3 |
| Glycolether boiling above about 100° C | 0.1 to 2 |
| Water to balance to | 100 |

8. An aqueous emulsified polish comprising the following ingredients in approximately the specified proportions by weight:

|  | Per cent |
|---|---|
| Carnauba wax | 8 to 15 |
| Triethanolamine | 1 to 3 |
| Oleic acid | 0.75 to 6 |
| Borax | 0.5 to 3 |
| Shellac | 1 to 5 |
| Ammonium hydroxide | 0.1 to 0.3 |
| Mono-ethylether of di-ethylene glycol | 0.1 to 2 |
| Water to balance to | 100 |

9. An emulsified composition of matter consisting approximately of the following weight percentages of the following ingredients:

|  | Per cent |
|---|---|
| Carnauba wax | 10.0 |
| Triethanolamine | 1.4 |
| Oleic acid | 1.4 |
| Borax | 1.0 |
| Linseed oil | 0.5 |
| Mono-ethyl ether of di-ethylene glycol | 0.5 |
| Refined shellac | 1.4 |
| Ammonium hydroxide | 0.2 |
| Water | 83.6 |

GEORGE W. FLINT.